(12) United States Patent
Wu et al.

(10) Patent No.: US 10,125,218 B2
(45) Date of Patent: *Nov. 13, 2018

(54) INTERMEDIATE TRANSFER MEMBERS

(71) Applicant: Xerox Corporation, Norwalk, CT (US)

(72) Inventors: Jin Wu, Pittsford, NY (US); Lin Ma, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 68 days.

This patent is subject to a terminal disclaimer.

(21) Appl. No.: 15/219,799

(22) Filed: Jul. 26, 2016

(65) Prior Publication Data

US 2018/0030204 A1 Feb. 1, 2018

(51) Int. Cl.
| | |
|---|---|
| *C08G 65/323* | (2006.01) |
| *C08G 65/18* | (2006.01) |
| *C08G 81/00* | (2006.01) |
| *C08J 7/04* | (2006.01) |
| *C09D 161/28* | (2006.01) |
| *G03G 15/16* | (2006.01) |
| *C08K 3/04* | (2006.01) |

(52) U.S. Cl.
CPC ......... *C08G 65/3236* (2013.01); *C08G 65/18* (2013.01); *C08G 81/00* (2013.01); *C08J 7/042* (2013.01); *C08J 7/047* (2013.01); *C09D 161/28* (2013.01); *G03G 15/162* (2013.01); *G03G 15/1685* (2013.01); *C08J 2361/28* (2013.01); *C08J 2471/00* (2013.01); *C08K 3/04* (2013.01)

(58) Field of Classification Search
None
See application file for complete search history.

(56) References Cited

U.S. PATENT DOCUMENTS

| | | | | |
|---|---|---|---|---|
| 6,660,828 B2* | 12/2003 | Thomas | ............... | C08G 65/18 106/10 |
| 6,995,222 B2* | 2/2006 | Buckanin | ............ | C09D 133/16 525/374 |
| 8,170,441 B2* | 5/2012 | Ferrar | ................. | G03G 15/161 399/101 |
| 8,410,202 B1* | 4/2013 | Wu | ....................... | C08L 71/00 524/104 |
| 8,541,104 B2* | 9/2013 | Wu | ....................... | B32B 27/08 399/121 |
| 2006/0263533 A1* | 11/2006 | Kaplan | ............... | C09D 127/12 427/385.5 |
| 2010/0248108 A1* | 9/2010 | Wu | ..................... | G03G 15/162 430/104 |
| 2012/0107559 A1* | 5/2012 | Ferrar | ................. | G03G 15/162 428/143 |
| 2012/0171494 A1* | 7/2012 | Ferrar | ................. | G03G 15/161 428/411.1 |

(Continued)

FOREIGN PATENT DOCUMENTS

| | | | |
|---|---|---|---|
| JP | 2014149479 A | * | 8/2014 |
| WO | WO 02/092660 | | 11/2002 |

OTHER PUBLICATIONS

Machine translation of JP 2014-149479 A, retrieved Mar. 2018 (Year: 2018).*

*Primary Examiner* — Nicole M. Buie-Hatcher
(74) *Attorney, Agent, or Firm* — Eugene O. Palazzo

(57) ABSTRACT

An intermediate transfer member that includes a hydroxyl terminated poly(oxetane) based fluorinated polyether optionally crosslinked with an aminoplast resin.

14 Claims, 1 Drawing Sheet

(56) References Cited

U.S. PATENT DOCUMENTS

| | | | |
|---|---|---|---|
| 2013/0320272 A1* | 12/2013 | Wu | G03G 15/162 |
| | | | 252/511 |
| 2014/0127616 A1* | 5/2014 | Wu | G03G 5/0546 |
| | | | 430/58.5 |
| 2015/0050055 A1 | 2/2015 | Wu et al. | |
| 2015/0076413 A1* | 3/2015 | Wu | G03G 15/162 |
| | | | 252/500 |
| 2015/0343797 A1* | 12/2015 | Song | C09D 11/38 |
| | | | 347/103 |
| 2017/0298202 A1* | 10/2017 | Ramappa | C08J 7/12 |

\* cited by examiner

INTERMEDIATE TRANSFER MEMBERS

This disclosure is generally directed to intermediate transfer members comprising a hydroxyl terminated poly(oxetane) based fluorinated polyether.

BACKGROUND

Intermediate transfer members selected for transferring a developed image from a photoconductor in xerographic systems are known. For example, there are known intermediate transfer members that include materials with inadequate surface properties, and characteristics that cause these members to become brittle resulting in inadequate acceptance of a toner developed image and subsequent partial transfer of the developed image to a substrate like paper.

Intermediate transfer members containing certain fluoro surface layers usually comprising low surface energy materials, such as TEFLON® materials like fluorinated ethylene propylene copolymer (FEP), polytetrafluoroethylene (PTFE), polyfluoroalkoxy polytetrafluoroethylene (PFA TEFLON®) and other TEFLON® related materials, are known; however, these materials have a tendency to bioaccumulate, where bioaccumulate refers, for example, to the undesirable accumulation of substances, such as pesticides, or other chemicals in an organism, such as people and animals, which accumulation results from absorption of toxic substances by the organism.

Moreover, it is known that many fluoro containing components are not environmentally friendly, can be toxic, and they tend to bioaccumulate. Thus, perfluorooctane sulfonates (PFOS) and perfluorooctanoic acids (PFOA) are perfluorinated surfactants used to produce polymers and telomers result in bioaccumulation and also PFOS may be concentrated in the food chain. In 2000 the Environmental Protection Agency (EPA) directed that PFOA and PFOS be withdrawn from production and sale to avoid environmental pollution issues. Further, in 2002 the Organization for Economic Co-operation and Development reported that the aforementioned fluoro containing components are bio-persistent, tend to accumulate in different tissues of living organisms, and are toxic to mammals.

High speed machines typically require multi-layer intermediate transfer members that separate the functions of each layer. For example, known dual intermediate transfer belts can include a polyimide base layer and a functional surface layer thereon, where the polyimide base layer provides for mechanical integrity, while the surface layer has low surface energy properties.

Intermediate transfer members that enable acceptable registration of the final color toner image in xerographic color systems using synchronous development of one or more component colors, and using one or more transfer stations, are known. However, a disadvantage of using an intermediate transfer member, in color systems, is that a plurality of developed toner transfer operations is utilized, thus sometimes causing charge exchange between the toner particles and the transfer member, which ultimately can result in less than complete toner transfer. This can result in low resolution images on the image receiving substrate like paper, and image deterioration. When the image is in color, the image can additionally suffer from color shifting and color deterioration.

There is a need for intermediate transfer members that substantially avoid or minimize the disadvantages of a number of known intermediate transfer members.

Also, there is need for intermediate transfer members comprising fluoro polymers that are environmentally acceptable, and that are free of, or possess minimal bioaccumulation characteristics.

Further, there is a need for intermediate transfer members with surfaces that are uniform, durable, have a low surface energy, and are free of bioaccumulation characteristics.

Yet additionally, there is a need for intermediate transfer members that permit excellent toner transfer from a photoconductor, and improve the cleaning efficiency of these members in xerographic imaging and printing systems.

Further, there is a need for intermediate transfer members with excellent wear and acceptable abrasion resistance, and which members possess improved stability with no or minimal degradation for extended time periods.

Another need relates to intermediate transfer members that have excellent conductivity or resistivity, and that possess acceptable humidity insensitivity characteristics leading to developed images with minimal resolution issues.

These and other needs may be achievable in embodiments with the intermediate transfer members and components thereof disclosed herein.

SUMMARY

Disclosed is an intermediate transfer member comprising a hydroxyl terminated poly(oxetane) based fluorinated polyether.

Also disclosed is an intermediate transfer member comprising in sequence a supporting substrate layer and a layer in contact with said supporting substrate comprising a mixture of a conductive component, an acid catalyst, and a hydroxyl terminated poly(oxetane) based fluorinated polyether as represented by at least one of the following formulas/structures wherein x and y represent the number of segments with x being from about 1 to about 40 and y being from about 1 to about 40

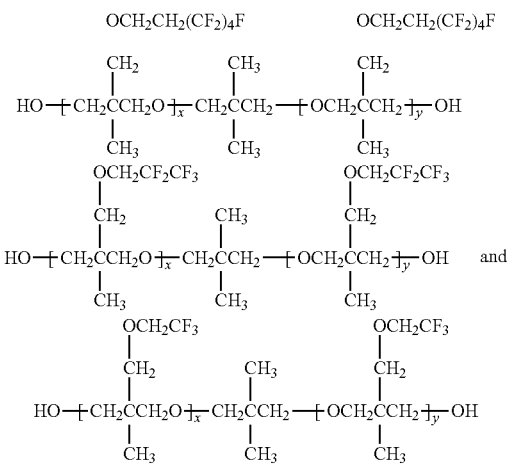

wherein said hydroxyl terminated poly(oxetane) based fluorinated polyether is crosslinked with an aminoplast resin, and which member is substantially free of bioaccumulation characteristics.

Yet further disclosed is an intermediate transfer member comprising in sequence a supporting substrate layer and in contact with said supporting substrate layer a mixture comprising a conductive component, a melamine formaldehyde resin, an optional catalyst, and a hydroxyl terminated poly (oxetane) based fluorinated polyether as represented by at least one of the following formulas/structures wherein x and y represent the number of segments

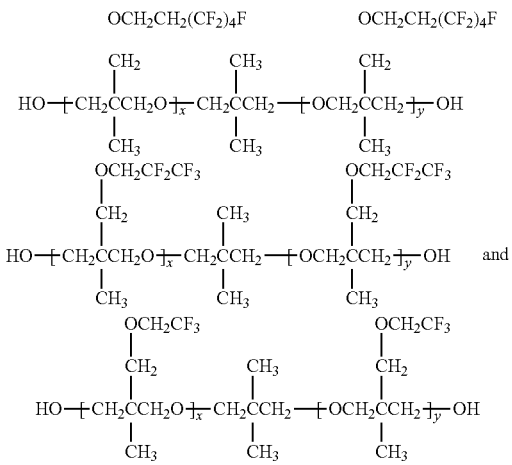

and wherein said hydroxyl terminated poly(oxetane) based fluorinated polyether is crosslinked with said melamine formaldehyde resin, and which member is substantially free of bioaccumulation characteristics.

FIGURES

The following Figures are provided to further illustrate the intermediate transfer members disclosed herein.

EMBODIMENTS

Figure 1:
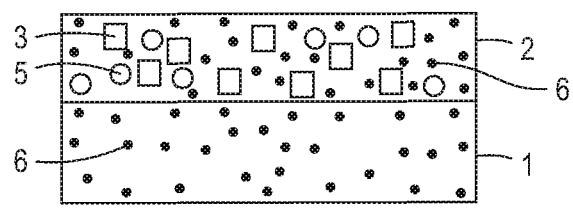
FIG. 1 illustrates an exemplary embodiment of an optional two layer intermediate transfer member of the present disclosure.

In FIG. 1 there is illustrated an intermediate transfer member comprising an optional supporting layer 1, a layer 2 disposed on the supporting substrate layer 1 and comprising a hydroxyl terminated poly(oxetane) based fluorinated polyether crosslinked with an aminoplast resin 3, an optional siloxane polymer 5, and an optional conductive component 6, which optional conductive component 6 can also be included in the optional supporting substrate layer 1.

Figure 2:
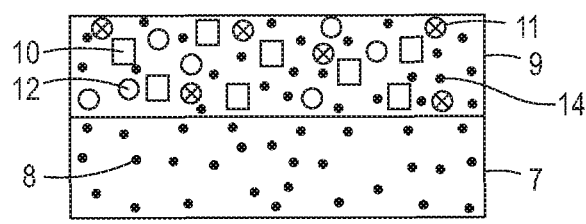
FIG. 2 illustrates an exemplary embodiment of a two-layer intermediate transfer member of the present disclosure.

In FIG. 2 there is illustrated a two-layer intermediate transfer member comprising a bottom supporting layer 7, comprising a conductive component 8, wherein layer 7 supports a layer 9, comprising component 10, comprising a hydroxyl terminated poly(oxetane) based fluorinated polyether crosslinked with a melamine formaldehyde, wherein the layer 9 further includes a catalyst 11, an optional siloxane polymer 12, and a conductive component 14.

Figure 3:
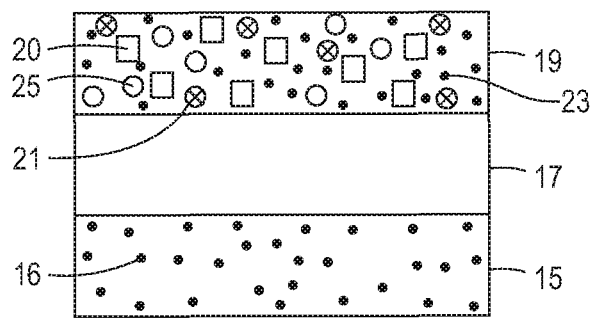
FIG. 3 illustrates an exemplary embodiment of a three-layer intermediate transfer member of the present disclosure.

In FIG. 3 there is illustrated a three-layer intermediate transfer member comprising a supporting substrate 15, comprising a conductive component 16, which supports an elastic layer 17, and wherein the three-layer intermediate transfer member further includes a third layer 19, comprising a component 20, of a hydroxyl terminated poly(oxetane) based fluorinated polyether crosslinked with a melamine formaldehyde, wherein the third layer 19, further includes an acid catalyst 21, a conductive component 23, and an optional siloxane polymer 25.

The intermediate transfer members of the present disclosure thus can be provided in a variety of configurations, such as a one-layer configuration, or in a multi-layer configuration. More specifically, the final configuration of any of the above-disclosed intermediate transfer members may be in the form of an endless flexible belt, a web, a flexible drum or roller, a rigid roller or cylinder, a sheet, a drelt (a cross between a drum and a belt), a seamless belt that is specifically manufactured to have no seams or visible joints in the members, and the like.

Fluoro Components or Fluoride Containing Components

The disclosed environmentally acceptable fluoro components or fluoride containing components include, for example, fluorinated polyethers, such as hydroxyl terminated fluorinated polyethers that are based on poly(oxetane) polymers, reference U.S. Pat. No. 7,087,710.

Compared, for example, to certain telomer-based and other conventional fluorochemicals, such as perfluoropolyethers (FLUOROLINK®), PFA, and PTFE, the disclosed poly(oxetane) based fluorinated polyethers, especially when crosslinked with an aminoplast resin, are free of bioaccumulation, thus allowing for reduced and low environmental impacts and are soluble or dispersible in a variety of common organic solvents including ketones, alcohols and esters.

Examples of fluoro components or fluoride containing components selected for the intermediate transfer members of the present disclosure include hydroxyl terminated poly(oxetane) based fluorinated polyethers as represented by at least one of the following formulas/structures and mixtures thereof

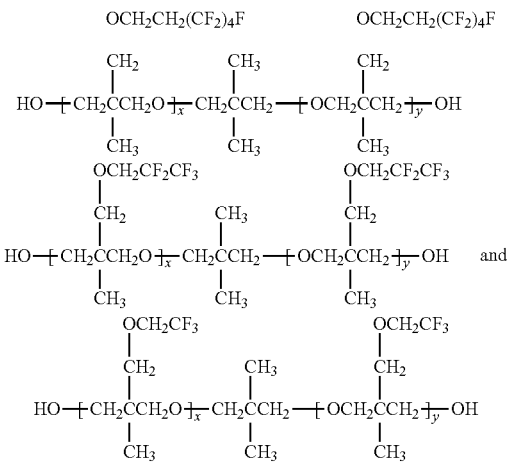

where x and y represent the number of repeating segments, and more specifically, for example, wherein x is, for example, in the range of from about 1 to about 40, from about 2 to about 20, from about 5 to about 15, and from about 5 to about 12, and y is, for example, from about 1 to about 40, from about 2 to about 20, from about 5 to about 15, and from 5 to about 10, and the sum of x and y is, for example, from about 2 to about 80, from about 2 to about 60, from about 6 to about 20, from about 4 to about 30, and from about 7 to about 18.

The fluorine or fluoride (F) content of the hydroxyl terminated poly(oxetane) based fluorinated polyethers as determined by known methods, such as IR spectroscopy, is, for example, from about 10 to about 70 weight percent, from about 20 to about 50 weight percent, and from about 45 to about 50 weight percent, with the weight average molecular weight $M_w$ of the hydroxyl terminated poly(oxetane) based fluorinated polyethers as determined by GPC analysis, being for example, from about 300 to about 10,000, from about 500 to about 8,000, from about 1,000 to about 6,000, from about 2,500 to about 5,500, and from about 1,500 to about 1,900. The hydroxyl number of the hydroxyl terminated poly(oxetane) based fluorinated polyethers as determined by known methods, such as gravimetric analysis, is, for example, from about 20 to about 200 milligrams KOH/gram, from about 50 to about 125 milligrams KOH/gram, from about 75 to about 100 milligrams KOH/gram, and from about 65 to about 70 milligrams KOH/gram.

Specific examples of the environmentally acceptable hydroxyl terminated poly(oxetane) based fluorinated polyethers, obtainable from OMNOVA Solutions Incorporated, are available as POLYFOX™ PF-7002, with a weight average molecular weight of about 1,670±200, a fluoride (F) content of about 46 percent, and a hydroxyl number of about 67.2±8 mg KOH/g); POLYFOX™ PF-636, having a weight average molecular weight of about 1,150, a fluoride (F) content of about 27.6 percent, and a hydroxyl number of about 99.5 milligrams KOH/gram; POLYFOX™ PF-6320, (x+y equal to, or about 20) having a weight average molecular weight of about 3,480, a fluoride content (F) of about 29.9 percent, and a hydroxyl number of about 32.2 milligrams KOH/gram; POLYFOX™ PF-656, (x+y equal to, or about 6) with a weight average molecular weight of about 1,490, a fluoride content (F) of about 34.7 percent, and a hydroxyl number of about 75.2 milligrams KOH/gram; POLYFOX™ PF-6520, (x+y equal to, or about 20) having a weight average molecular weight of about 4,480, a fluoride content (F) of about 39.3 percent, and a hydroxyl number of about 25 milligrams KOH/gram; POLYFOX™ PF-151N, having a weight average molecular weight of about 2,815, a fluorine content (F) of about 24.5 percent, and a hydroxyl number of about 39.9 milligrams KOH/gram; POLYFOX™ PF-154N, having a weight average molecular weight of about 3,464, a fluoride content (F) of about 19.5 percent, and a hydroxyl number of about 32.4 milligrams KOH/gram; and POLYFOX™ PF-159, with a weight average molecular weight of about 3,300, a fluoride content (F) of about 15.4 percent, and a hydroxyl number of about 34 milligrams KOH/gram, and mixtures thereof.

Various effective amounts of the hydroxyl terminated poly(oxetane) based fluorinated polyethers can be selected, such as for example, from about 1 to about 75 weight percent, from about 5 to about 70 weight percent, from about 10 to about 50 weight percent, from about 10 to about 40 weight percent, and from about 15 to about 35 weight percent, based on the percent solids present.

Aminoplast Resins

Aminoplast resins refers, for example, to a type of amino resin obtained from nitrogen-containing substances and formaldehyde, wherein the nitrogen-containing substance includes, for example, resins of melamine, urea, benzoguanamine, glycoluril, and the like.

Melamine resin examples are available under various trade names, including but not limited to CYMEL™, BEETLE™, DYNOMIN™, BECKAMINE™, UFR™, BAKELITE™, ISOMIN™, MELAICAR™, MEL-BRITE™, MELMEX™, MELOPAS™, RESART™, and ULTRAPAS™.

Examples of melamine resins can be represented by the following formulas/structures

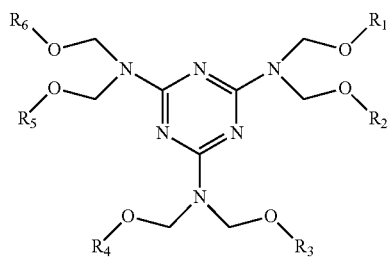

wherein $R_1$, $R_2$, $R_3$, $R_4$, $R_5$ and $R_6$ each independently represent at least one of a hydrogen atom, and an alkyl group with, for example, from 1 to about 12 carbon atoms, from 1 to about 8 carbon atoms, and from 1 to about 4 carbon atoms. Examples of specific alkyl groups include methyl, ethyl, propyl, butyl, pentyl, hexyl, heptyl, octyl, nonyl, decyl, and so forth.

Specific examples of melamine resins include methylated and/or butylated melamine formaldehyde resins, such as those commercially available from Cytec Industries, as CYMEL® 303, 104, MM-100, and the like; NIKANAC® M-390 available from Sanwa Chemical Company Limited of Japan, and the like. The melamine formaldehyde resins, which can be water-soluble, dispersible or nondispersible, may exhibit a high percent of alkylation, such as from about 75 to about 95 percent, from about 80 to about 95 percent, from about 75 to about 90 percent, and from about 85 to about 90 percent; partially or mixed alkylated/alkoxylated resins of, for example, having from about 40 to about 65 percent alkylation/alkoxylation; methylated, n-butylated or isobutylated resins; highly methylated melamine resins such as CYMEL® 350, 9370; methylated imino melamine resins (partially methylolated and highly alkylated) such as CYMEL® 323, 327; partially methylated melamine resins (highly methylolated and partially methylated) such as CYMEL® 373, 370; high solids mixed ether melamine resins such as CYMEL® 1130, 324; n-butylated melamine resins such as CYMEL® 1151, 615; n-butylated high imino melamine resins such as CYMEL® 1158; and isobutylated melamine resins such as CYMEL® 255-10. CYMEL® melamine resins are commercially available from CYTEC Industries, Inc.

The disclosed herein CYMEL® 303, available from Cytec Industries as $(CH_3OCH_2)_6N_3C_3N_3$, can be represented by the following formula/structure

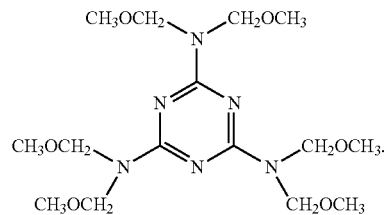

Urea resin examples are known under various trade names, including but not limited to CYMEL™, BEETLE™, DYNOMIN™, BECKAMINE™, and AMIREME™.

Benzoguanamine resins can be considered amino resins prepared from benzoguanamine and formaldehyde.

Examples of benzoguanamine resins are known under various trade names, including but not limited to CYMEL™, BEETLE™, and UFORMITE™.

Glycoluril resins are amino resins prepared from glycoluril and formaldehyde. Glycoluril resins are known under various trade names, including but not limited to CYMEL™ and POWDERLINK™.

The benzoguanamine resin selected can be represented by the following formulas/structure

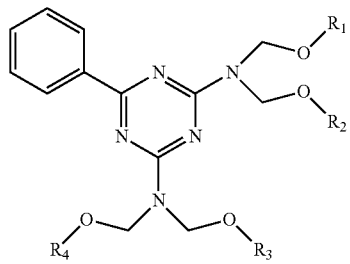

in which $R_1$, $R_2$, $R_3$, and $R_4$ each independently represents a hydrogen atom or an alkyl chain with 1 to 8 carbon atoms, or with 1 to 4 carbon atoms.

In embodiments, the benzoguanamine resin is water-soluble, dispersible or indispersible. In various embodiments, the benzoguanamine resin can be highly alkylated/alkoxylated, partially alkylated/alkoxylated, or mixed alkylated/alkoxylated. In various embodiments, the benzoguanamine resin can be methylated, n-butylated or isobutylated. Examples of the benzoguanamine resin include CYMEL® 1123, and CYMEL® 5010, both commercially available from Allnex Belgium SA/NV.

Glycoluril resin examples can be represented by the following formulas/structure

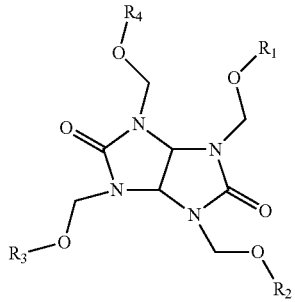

in which $R_1$, $R_2$, $R_3$, and $R_4$ each independently represents a hydrogen atom or an alkyl chain with 1 to 8 carbon atoms, or with 1 to 4 carbon atoms.

In embodiments, the glycoluril resin is water-soluble, dispersible or indispersible, and this resin can be highly alkylated/alkoxylated, partially alkylated/alkoxylated, or mixed alkylated/alkoxylated. Examples of the glycoluril resin include CYMEL® 1170, 1171, 1172, all commercially available from Allnex Belgium SA/NV.

The aminoplast resin, such as the melamine formaldehyde resin, can be selected in an amount of, for example, from about 1 to about 95 weight percent, from about 5 to about 85 weight percent, from about 10 to about 90 weight percent, and from about 10 to about 75 weight percent based on the total weight, or percent of the solids such as the crosslinked reaction product of the hydroxyl terminated poly(oxetane) based fluorinated polyethers and the aminoplast resin, the conductive component when present, the polymer when present, and the catalyst when present.

Catalysts

The crosslinking reaction and thus rapid curing of the aminoplast resin, and the hydroxyl terminated poly(oxetane) based fluorinated polyether can be accomplished with an acid catalyst, such as a strong acid catalyst. The acid catalyst can be unblocked or blocked. Examples of acid catalysts selected for the crosslinking reaction include p-toluene sulfonic acid (p-TSA), dinonylnaphthalenedisulfonic acid (DNNDSA), dinonylnaphthalenesulfonic acid (DNNSA), dodecylbenzenesulfonic add (DDBSA), commercially available acid catalysts available from CYCAT® (Cytec Industries, Inc.) such as CYCAT® 600, CYCAT® 4040, and NACURE® (Kings Industries, Inc.) such as NACURE® 3525, NACURE® 1557, NACURE® 5225, NACURE® 2530, NACURE® XP-357, and the like. In embodiments, the catalyst can be added to the mixture components of the aminoplast resin, and the hydroxyl terminated poly(oxetane) based fluorinated polyether in an amount of from about 0.1 to about 5 weight percent, from about 0.3 to about 3 weight percent, and from about 0.4 to about 1 weight percent based on the total solids contained in the mixture.

Various specific processes can be utilized to obtain crosslinking of the hydroxyl terminated poly(oxetane) based fluorinated polyether. For example, a hydroxyl terminated poly(oxetane) based fluorinated polyether, a solvent, an aminoplast resin, and an acid catalyst can be heated and cured with stirring to a temperature of from about 120° C. to about 200° C., or from about 150° C. to about 175° C. for a period of time of for, example, from about 30 to about 75 minutes, and from about 40 to about 60 minutes, followed by cooling the resulting mixture to room temperature of about 25° C. Also, the generated crosslinked mixture can include the catalyst in the amounts illustrated herein.

While not desiring to be limited by theory, it is believed that the crosslinking percentage of the hydroxyl terminated poly(oxetane) based fluorinated polyether/aminoplast resin, subsequent to curing, is for example, from about 55 to about 99 percent, from about 95 to about 99, from about 77 to about 97 percent, from about 80 to about 95 percent, or from about 70 to about 90 percent, as determined by known methods, such as determined with Fourier Transform Infrared Spectroscopy (FTIR).

Elastic Layer

Examples of materials selected for the elastic layer or functional intermediate layer, also referred to as cushioning layer, include fluorosilicones, silicone rubbers such as room temperature vulcanization (RTV) silicone rubbers, high temperature vulcanization (HTV) silicone rubbers, and low temperature vulcanization (LTV) silicone rubbers. These rubbers are known and readily available commercially, such as SILASTIC® 735 black RTV and SILASTIC® 732 RTV, both from Dow Corning; 106 RTV Silicone Rubber and 90 RTV Silicone Rubber, both from General Electric; and JCR6115CLEAR HTV and SE4705U HTV silicone rubbers from Dow Corning Toray Silicones. Other suitable silicone materials include siloxanes (such as polydimethylsiloxanes); fluorosilicones, such as Silicone Rubber 552, available from Sampson Coatings, Richmond, Va.; liquid silicone rubbers such as vinyl crosslinked heat curable rubbers or silanol room temperature crosslinked materials; and the like; Dow Corning Sylgard 18; commercially available LSR rubbers like Dow Corning Q3-6395, Q3-6396, SILASTIC® 590 LSR, SILASTIC® 591 LSR, SILASTIC® 595 LSR, SILASTIC® 596 LSR, and SILASTIC® 598 LSR, all available from Dow Corning. The functional layer provides elasticity and can be mixed with inorganic particles of, for example, SiC (also known as silicon carbide or carborundum) or $Al_2O_3$.

Other examples of the materials suitable for use as functional intermediate layer include fluoroelastomers. Fluoroelastomers include 1) copolymers of vinylidenefluoride, hexafluoropropylene, and tetrafluoroethylene, such as those known commercially as VITON A®; 2) terpolymers of vinylidenefluoride, hexafluoropropylene, and tetrafluoroethylene, known commercially as VITON B®; and 3) tetrapolymers of vinylidenefluoride, hexafluoropropylene, tetrafluoroethylene, and a cure site monomer, such as those known commercially as VITON GH® or VITON GF®, VITON E®, VITON E 60C®, VITON E430®, VITON 910®, and VITON ETP®. The VITON® designation is a trademark of E.I. DuPont de Nemours, Inc. The cure site monomer can be 4-bromoperfluorobutene-1,1,1-dihydro-4-bromoperfluorobutene-1, 3-bromoperfluoropropene-1,1,1-dihydro-3-bromoperfluoropropene-1, or any other suitable known cure site monomer, such as those commercially available from E.I. DuPont.

Additional available materials that can be selected for the elastic layer include a poly(propylene-tetrafluoroethylene), and FLUOREL II® (LII900) a poly(propylene-tetrafluoroethylenevinylidenefluoride), both also available from 3M Company, and the Tecnoflons identified as FOR-60KIR®, FOR-LHF®, NM® FOR-THF®, FOR-TFS®, TH®, NH®, P757®, TNS®, T439®, PL958®, BR9151® and TN505®, all available from Ausimont Chemicals; FLUOREL 2170®, FLUOREL 2174®, FLUOREL 2176®, FLUOREL 2177® and FLUOREL LVS 76®, all obtainable from 3M Company.

The fluoroelastomers VITON GH® and VITON GF® have relatively low amounts of vinylidenefluoride. The VITON GF® and VITON GH® have about 35 weight percent of vinylidenefluoride, about 34 weight percent of hexafluoropropylene, and about 29 weight percent of tetrafluoroethylene, with about 2 weight percent cure site monomer.

The thickness of the elastic layer, or functional intermediate layer is, for example, from about 10 microns to about 1,000 microns, from about 20 microns to about 200 microns, or from about 30 microns to about 80 microns as determined by a Permascope.

Supporting Substrates

When desired, a supporting substrate can be included in the intermediate transfer member, such as beneath the crosslinked mixture containing layer. The supporting substrate can be included to provide increased rigidity or strength to the intermediate transfer member.

Examples of supporting substrates are polyesters such as polyethylene terephthalate (PET), polybutylene terephthalate (PBT), and polyethylene naphthalate (PEN), polyamides, polyetherimides, polyamideimides, polyimides, polyphenyl sulfides, polyether ether ketones, polysulfones, polycarbonates, polyvinyl halides, polyolefins, mixtures thereof, and the like. Suitable specific substrate examples include MYLAR®, MELINEX®, TEIJIN®, TETORON®, and TEONEX®, considered to be bi-axially oriented polyester films which are commercially available in a variety of finishes and thicknesses. These and other similar polymers are available from E.I. DuPont Company and SKC Incorporated.

Additional examples of intermediate transfer member supporting substrates include known low temperature, and rapidly cured polyimide polymers, such as VTEC™ PI 1388, 080-051, 851, 302, 203, 201, and PETI-5, all available from Richard Blaine International, Incorporated, Reading, Pa. These thermosetting polyimides can be cured at temperatures of from about 180° C. to about 260° C., over a short period of time, such as from about 10 to about 120 minutes, or from about 20 to about 60 minutes, and generally have, as determined by known GPC analysis, a number average molecular weight of, for example, from about 5,000 to about 500,000, or from about 10,000 to about 100,000, and a weight average molecular weight of, for example, from about 50,000 to about 5,000,000, or from about 100,000 to about 1,000,000.

Also, for the intermediate transfer member supporting substrates there can be selected thermosetting polyimides that can be cured at temperatures above 300° C., such as PYRE M.L®, RC-5019, RC 5057, RC-5069, RC-5097, RC-5053, and RK-692, all commercially available from Industrial Summit Technology Corporation, Parlin, N.J.; RP-46 and RP-50, both commercially available from Unitech LLC, Hampton, Va.; DURIMIDE® 100, commercially available from FUJIFILM Electronic Materials U.S.A., Inc., North Kingstown, R.I.; and KAPTON® HN, VN and FN, all commercially available from E.I. DuPont, Wilmington, Del.

Additionally, suitable polyimides that may be selected for the disclosed intermediate transfer members are known thermosetting polyimides formed from the imidization, by heating and curing, of a polyamic acid, or a polyimide precursor. Examples of these thermosetting polyimides include the imidization of at least one of a polyamic acid of pyromellitic dianhydride/4,4'-oxydianiline, a polyamic acid of pyromellitic dianhydride/phenylenediamine, a polyamic acid of biphenyl tetracarboxylic dianhydride/4,4'-oxydianiline, a polyamic acid of biphenyl tetracarboxylic dianhydride/phenylenediamine, a polyamic acid of benzophenone tetracarboxylic dianhydride/4,4'-oxydianiline, a polyamic acid of benzophenone tetracarboxylic dianhydride/4,4'-oxydianiline/phenylenediamine, and the like, and mixtures thereof. The heating and curing may be at temperatures that are suitable to cause the imidization of the polyamic acid, which temperature is believed to be from about 235° C. to about 340° C., from about 260° C. to about 325° C., from about 275° C. to about 300° C., from about 260° C. to about 325° C., or from about 190° C. to about 325° C.

Commercially available examples of the selected polyamic acids of pyromellitic dianhydride/4,4-oxydianilines are PYRE-ML® RC5019 (about 15 to about 16 weight percent in N-methyl-2-pyrrolidone, NMP), RC5057 (about 14.5 to about 15.5 weight percent in NMP/aromatic hydrocarbon, ratio of 80/20), and RC5083 (about 18 to about 19 weight percent in NMP/DMAc, ratio of 15/85), obtainable from Industrial Summit Technology Corporation, Parlin, N.J.; and DURIMIDE® 100, commercially available from FUJIFILM Electronic Materials U.S.A., Inc.

Examples of polyamic acids of biphenyl tetracarboxylic dianhydride/4,4'-oxydianilines that may be selected for the generation of the polyimides for the disclosed intermediate transfer members include U-VARNISH A™, and VARNISH S™ (about 20 weight in NMP), both available from UBE America Inc., New York, N.Y. Polyamic acids of biphenyl tetracarboxylic dianhydride/phenylenediamine examples include PI-2610 (about 10.5 weight in NMP), and PI-2611 (about 13.5 weight in NMP), both available from HD MicroSystems, Parlin, N.J.

Further examples of polyimides that may be selected for the disclosed intermediate transfer member can be obtained from the curing at temperatures of from about 260° C. to about 325° C. of polyamic acids of benzophenone tetracarboxylic dianhydride/4,4'-oxydianilines, such as RP46 and RP50 (about 18 weight percent in NMP), both available from Unitech Corp., Hampton, Va. Commercially obtainable from HD MicroSystems, Parlin, N.J., examples of polyamic acids of benzophenone tetracarboxylic dianhydride/4,4'-oxydianiline/phenylenediamines that can be selected are PI-2525 (about 25 weight percent in NMP), PI-2574 (about 25 weight percent in NMP), PI-2555 (about 19 weight percent in NMP/aromatic hydrocarbon, ratio of 80/20), and PI-2556 (about 15 weight percent in NMP/aromatic hydrocarbon/propylene glycol methyl ether, ratio of 70/15/15). Also, examples of polyamic acids or esters of polyamic acid that can be imidized by curing can be generated by the reaction of a dianhydride and a diamine. The dianhydride and diamine reactants can be selected in various suitable amounts, such as for example a weight ratio of dianhydride to diamine of from about 20:80 to about 80:20, from about 40/60 to about 60/40, and about a 50/50 weight ratio.

Polyimide intermediate transfer supporting substrate examples are represented, for example, by the following formulas/structures

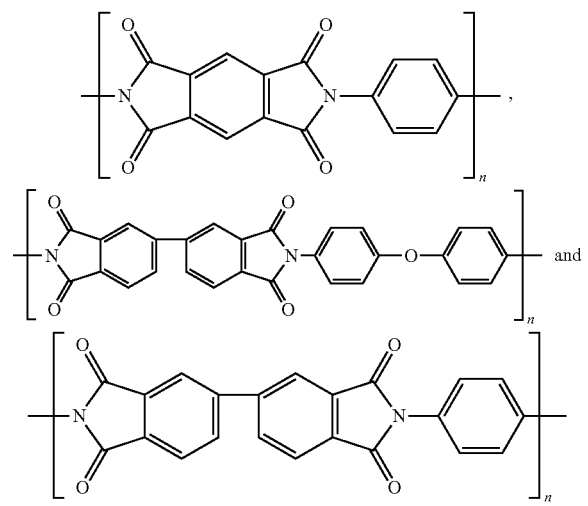

where n represents the number of repeating segments, such as, for example, from about 30 to about 300, from about 75 to about 225, or from about 100 to about 175.

Examples of polyamideimides that can be selected as supporting substrates for the intermediate transfer members disclosed herein are VYLOMAX® HR-11NN (15 weight percent solution in N-methylpyrrolidone, $T_g$=300° C., and $M_w$=45,000), HR-12N2 (30 weight percent solution in N-methylpyrrolidone/xylene/methyl ethyl ketone=50/35/15, $T_g$=255° C., and $M_w$=8,000), HR-13NX (30 weight percent solution in N-methylpyrrolidone/xylene=67/33, $T_g$=280° C., and $M_w$=10,000), HR-15ET (25 weight percent solution in ethanol/toluene=50/50, $T_g$=260° C., and $M_w$=10,000), HR-16NN (14 weight percent solution in N-methylpyrrolidone, $T_g$=320° C., and $M_w$=100,000), all commercially available from Toyobo Company of Japan, and TORLON® AI-10 ($T_g$=272° C.), commercially available from Solvay Advanced Polymers, LLC, Alpharetta, Ga.

Specific examples of polyetherimide supporting substrates that can be selected for the intermediate transfer members disclosed herein are ULTEM® 1000 ($T_g$=210° C.), 1010 ($T_g$=217° C.), 1100 ($T_g$=217° C.), 1285, 2100 ($T_g$=217° C.), 2200 ($T_g$=217° C.), 2210 ($T_g$=217° C.), 2212 ($T_g$=217° C.), 2300 ($T_g$=217° C.), 2310 ($T_g$=217° C.), 2312 ($T_g$=217° C.), 2313 ($T_g$=217° C.), 2400 ($T_g$=217° C.), 2410 ($T_g$=217° C.), 3451 ($T_g$=217° C.), 3452 ($T_g$=217° C.), 4000 ($T_g$=217° C.), 4001 ($T_g$=217° C.), 4002 ($T_g$=217° C.), 4211 ($T_g$=217° C.), 8015, 9011 ($T_g$=217° C.), 9075, and 9076, all commercially available from Sabic Innovative Plastics.

The supporting substrate can be of a number of different thicknesses, such as from about 25 to about 250 microns, from about 50 to about 200 microns, or from about 75 to about 150 microns, measured by various known means such as a Permascope.

Optional Conductive Components

Optionally, the intermediate transfer member may contain one or more conductive components to, for example, alter and adjust the conductivity of the intermediate transfer member. Where the intermediate transfer member is a one layer structure, the conductive component can be included in the crosslinked mixture disclosed herein. However, where the intermediate transfer member is a multi-layer structure, the conductive component can be included in one or more layers of the member, such as in the supporting substrate, the crosslinked mixture layer coated thereon, and in both the supporting substrate and the crosslinked mixture layer.

Any suitable conductive component can be used that provides the desired results, such as carbon blacks, metal oxides, polyanilines, other known suitable conductive components, and mixtures thereof.

Examples of carbon blacks that can be selected for the intermediate transfer members illustrated herein include EMPEROR® 1200, and EMPEROR® 1600 available from Cabot Corporation, special black 4 (B.E.T. surface area=180 m²/g, DBP absorption=1.8 ml/g, primary particle diameter=25 nanometers) available from Evonik-Degussa, special black 5 (B.E.T. surface area=240 m²/g, DBP absorption=1.41 ml/g, primary particle diameter=20 nanometers), color black FW1 (B.E.T. surface area=320 m²/g, DBP absorption=2.89 ml/g, primary particle diameter=13 nanometers), color black FW2 (B.E.T. surface area=460 m²/g, DBP absorption=4.82 ml/g, primary particle diameter=13 nanometers), color black FW200 (B.E.T. surface area=460 m²/g, DBP absorption=4.6 ml/g, primary particle diameter=13 nanometers), all available from Evonik-Degussa; VULCAN® carbon blacks, REGAL® carbon blacks, MONARCH® carbon blacks, and BLACK PEARLS® carbon blacks available from Cabot Corporation. Specific examples of conductive carbon blacks are BLACK PEARLS® 1000 (B.E.T. surface area=343 m²/g, DBP absorption=1.05 ml/g), BLACK PEARLS® 880 (B.E.T. surface area=240 m²/g, DBP absorption=1.06 ml/g), BLACK PEARLS® 800 (B.E.T. surface area=230 m²/g, DBP absorption=0.68 ml/g), BLACK PEARLS® L (B.E.T. surface area=138 m²/g, DBP absorption=0.61 ml/g), BLACK PEARLS® 570 (B.E.T. surface area=110 m²/g, DBP absorption=1.14 ml/g), BLACK PEARLS® 170 (B.E.T. surface area=35 m²/g, DBP absorption=1.22 ml/g), VULCAN® XC72 (B.E.T. surface area=254 m²/g, DBP absorption=1.76 ml/g), VULCAN® XC72R (fluffy form of VULCAN® XC72), VULCAN® XC605, VULCAN® XC305, REGAL® 660 (B.E.T. surface area=112 m²/g, DBP absorption=0.59 ml/g), REGAL® 400 (B.E.T. surface area=96 m²/g, DBP absorption=0.69 ml/g), REGAL® 330 (B.E.T. surface area=94 m²/g, DBP absorption=0.71 ml/g), MONARCH® 880 (B.E.T. surface area=220 m²/g, DBP absorption=1.05 ml/g, primary particle diameter=16 nanometers), and MONARCH® 1000 (B.E.T. surface area=343 m²/g, DBP absorption=1.05 ml/g, primary particle diameter=16 nanometers); special carbon blacks available from Evonik Incorporated; and Channel carbon blacks available from Evonik-Degussa. Other known suitable carbon blacks not specifically disclosed herein may be selected as the filler or conductive component for the intermediate transfer members disclosed herein.

Examples of polyanilines that can be selected for incorporation into the disclosed intermediate transfer members are PANIPOL™ F, commercially available from Panipol Oy, Finland; and known lignosulfonic acid grafted polyanilines. These polyanilines usually have a relatively small particle size diameter of, for example, from about 0.5 to about 5 microns; from about 1.1 to about 2.3 microns, or from about 1.5 to about 1.9 microns.

Metal oxide conductive components that can be selected for the disclosed intermediate transfer members include, for example, tin oxide, antimony doped tin oxide, indium oxide, indium tin oxide, zinc oxide, and titanium oxide, and the like.

When present, the conductive component can be selected in an amount of, for example, from about 1 to about 60 weight percent, from about 3 to about 60 weight percent, from about 3 to about 40 weight percent, from about 4 to about 30 weight percent, from about 10 to about 30 percent, from about 3 to about 30 weight percent, from about 8 to about 25 weight percent, and from about 13 to about 20 weight percent of the total solids.

Optional Polysiloxane Polymers

The illustrated herein intermediate transfer members can also include in the crosslinked mixture layer a polysiloxane polymer. Examples of polysiloxane polymers selected for the intermediate transfer member mixture disclosed herein include known suitable polysiloxanes, such as a polyether modified polydimethylsiloxane, commercially available from BYK Chemical as BYK® 333, BYK® 330 (about 51 weight percent in methoxypropylacetate), and BYK® 344 (about 52.3 weight percent in xylene/isobutanol, ratio of 80/20); BYK®-SILCLEAN 3710 and BYK® 3720 (about 25 weight percent in methoxypropanol); a polyester modified polydimethylsiloxane, commercially available from BYK Chemical as BYK® 310 (about 25 weight percent in xylene) and BYK® 370 (about 25 weight percent in xylene/alkylbenzenes/cyclohexanone/monophenylglycol, ratio of 75/11/7/7); a polyacrylate modified polydimethylsiloxane, commercially available from BYK Chemical as BYK®-SILCLEAN 3700 (about 25 weight percent in methoxypropylacetate); a polyester polyether modified polydimethylsiloxane, commercially available from BYK Chemical as BYK® 375 (about 25 weight percent in di-propylene glycol monomethyl ether); and the like, and mixtures thereof.

The polysiloxane polymer, or copolymers thereof can be present in the intermediate transfer member crosslinked mixture in various effective amounts, such as from about 0.01 to about 5 weight percent, from about 0.05 to about 3 weight percent, or from about 0.1 to about 1 weight percent based on the weight of components present in the initial mixture prior to curing, such as of the mixture of a carboxylic acid functionalized fluoro component, an aminoplast resin, a polysiloxane polymer when present, a catalyst when present, and when present the conductive component.

Solvents

The disclosed environmentally friendly poly(oxetane) based fluorinated polyethers are soluble or dispersible in a variety of common substantially non-toxic, organic solvents including ketones, alcohols, like isopropanol, DOWA-NOL®, 1-butanol, and cyclopentanol. Thus, examples of solvents selected, for example, in an amount of from about 50 to about 90 weight percent, and from about 60 to about 80 weight percent, with the solvent usually not present, except for residues thereof, in the final dried mixture product, include primary, secondary, and tertiary alcohol solvents or mixtures thereof. Alcohol solvent examples include, but are not limited to alkyl containing solvents like 1-butanol, tert-butanol, sec-butanol, n-butanol, iso-propanol, 1-methoxy-2-propanol, cyclopentanol, and the like, DOWA-NOL® PM and mixtures thereof.

The intermediate transfer members illustrated herein can be selected for a number of printing and copying systems, inclusive of xerographic printing systems. For example, the disclosed intermediate transfer members can be incorporated into a multi-imaging xerographic machine where each developed toner image to be transferred is formed on the imaging or photoconductive drum at an image forming station, and where each of these images is then developed at a developing station, and transferred to the intermediate transfer member. The images may be formed on a photoconductor and developed sequentially, and then transferred to the intermediate transfer member. In an alternative method, each image may be formed on the photoconductor or photoreceptor drum, developed, and then transferred in registration to the intermediate transfer member. In an embodiment, the multi-image system is a color copying system, wherein each color of an image being copied is formed on the photoreceptor drum, developed, and transferred to the intermediate transfer member.

After the toner latent image has been transferred from the photoreceptor drum to the intermediate transfer member, the intermediate transfer member may be contacted under heat and pressure with an image receiving substrate such as paper. The toner image on the intermediate transfer member is then transferred and fixed, in image configuration, to the substrate such as paper.

Specific embodiments will now be described in detail. These examples are intended to be illustrative, and are not limited to the materials, conditions, or process parameters set forth in these embodiments.

Example I

There was prepared an intermediate transfer member by initially preparing a fluoro surface layer dispersion by mixing POLYFOX™ PF-7002 (a poly(oxetane) based fluorinated polyether diol available from OMNOVA Solutions) of the following formula/structure

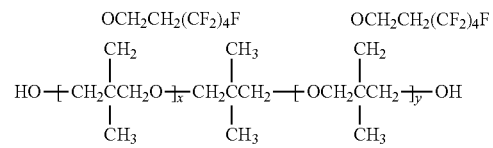

where x+y is from about 4 to about 5, with a GPC determined weight average molecular weight of about 1,670±200, a F (fluoride) content of about 46 percent, and a hydroxyl number of about 67.2±8 mg KOH/g, CYMEL® 303 (a melamine formaldehyde resin available from Allnex Incorporated), and the catalyst p-toluenesulfonic acid at the weight ratio of about 30/70/0.2 in isopropanol (about 20 weight percent solids) via agitation to obtain a clear polymeric base solution. Thereafter, there was added to the obtained solution EMPEROR® E1200 (a carbon black available from Cabot Corporation) followed by ball milling with 2 millimeters stainless steel shots at 200 revolutions per minute, for 20 hours, followed by filtering the resulting coating dispersion (POLYFOX™ PF-7002/CYMEL® 303/ EMPEROR® E1200/p-toluenesulfonic acid (30/70/6/0.2 ratio)) in isopropanol (about 20 weight percent solids), or in DOWANOL® PM (1-methoxy-2-propanol obtained from the Dow Chemical Company) through a 20-micron Nylon cloth filter to obtain the crosslinked containing coating mixture, where the crosslink amount was about 95 to about 99 percent as determined by Fourier Transform Infrared Spectroscopy (FTIR).

The above obtained crosslinked dispersion was then applied to a 75-micron thick polyimide intermediate supporting substrate transfer belt via a flow coater, and then the dispersion was subsequently cured at 180° C./30 minutes to obtain a 25-micron crosslinked surface layer.

The above polyimide supporting substrate belt selected can be represented by the following formula/structure

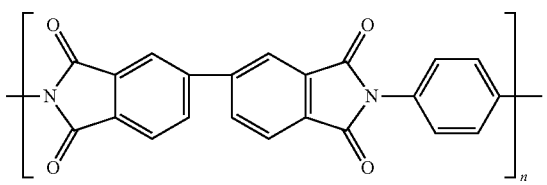

wherein n is about 30.

The surface resistivity of the above prepared crosslinked fluoro containing surface layer was measured to be about $5.6 \times 10^{10}$ ohm/square using a High Resistivity Meter (Hiresta-Up MCP-HT450 available from Mitsubishi Chemical Corporation). The surface layer possessed a pencil hardness of 1H (very close to that of the bottom polyimide belt) and was flexible, indicating excellent mechanical properties primarily because of the crosslinking, about 95 to about 99 percent, of the POLYFOX™ PF-7002 and the melamine formaldehyde resin.

In addition, the hexadecane contact angle, measured via Contact Angle System OCA (Dataphysics Instruments GmbH, model OCA15), of the crosslinked fluoro surface layer was about 65°±0° (noting that a pure PFTE film has a hexadecane contact angle of about 45°). From the hexadecane contact angle measurement, the data was very consistent across the surface layer with close to a 0 degree standard deviation, which contact angle was an indication of the excellent compatibility between the two resin components of the POLYFOX™ PF-7002, and the melamine formaldehyde resin.

It is believed that the above prepared intermediate transfer member is substantially free of bioaccumulation characteristics based primarily on the crosslinked POLYFOX™ PF-7002/melamine formaldehyde resin.

Example II

An intermediate transfer member is prepared by repeating the processes of Example I except there is selected in place of the POLYFOX™ PF-7002, a poly(oxetane) based fluorinated polyether diol of the following formula/structure, available from OMNOVA Solutions as POLYFOX™ PF-656 (x+y equal to or about 6), or POLYFOX™ PF-6520 (x+y equal to or about 20):

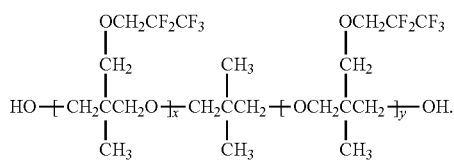

Example III

Two intermediate transfer members are prepared by repeating the process of Example I except there is selected in place of the POLYFOX™ PF-7002, a poly(oxetane) based fluorinated polyether diol of the following formula/structure, available from OMNOVA Solutions as POLYFOX™ PF-636 (x+y is equal to, or is about 6), and POLYFOX™ PF-6320 (x+y is equal to, or is about 20):

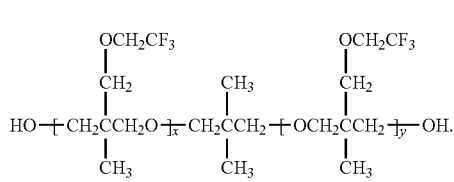

Example IV

An intermediate transfer member is prepared by repeating the processes of Example I except for the polyimide supporting layer there is selected the polyamic acid of biphenyl tetracarboxylic dianhydride/4,4'-oxydianiline available as BPDA resin, the polyimide generated from a polyamic acid of biphenyl tetracarboxylic dianhydride/4,4'-oxydianiline (U-VARNISH A obtained from UBE America Incorporated), a polyamic acid of biphenyl tetracarboxylic dianhydride/ phenylenediamine (PI-2610 obtained from HD MicroSystems), a polyamic acid of benzophenone tetracarboxylic dianhydride/4,4'-oxydianiline (RP50 obtained from Unitech Corporation), or a polyamic acid of benzophenone tetracarboxylic dianhydride/4,4'-oxydianiline/phenylenediamine (PI-2525 obtained from HD MicroSystems), and which polyimide supporting substrate may include therein about 25 weight percent of carbon black.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, component amounts, or materials.

What is claimed is:

1. An intermediate transfer member comprising a layer comprising a crosslinked component formed by reacting a hydroxyl terminated poly(oxetane)-based fluorinated polyether with an aminoplast resin selected from the group consisting of a melamine formaldehyde resin, a methylated/ butylated melamine formaldehyde resin and mixtures thereof, further including in said crosslinked component a conductive component, and wherein said hydroxyl terminated poly(oxetane) based fluorinated polyether is represented by one of the following formulas/structures

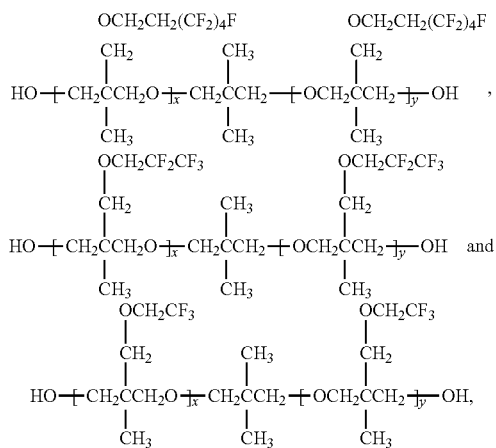

and wherein x and y are each from 1 to about 40, and optionally further including a supporting substrate.

2. An intermediate transfer member in accordance with claim 1 wherein said aminoplast resin is a melamine formaldehyde resin.

3. An intermediate transfer member in accordance with claim 1 wherein x is from about 2 to about 20, or from about 5 to about 12, and y is from about 2 to about 20, or from about 5 to about 10, and wherein said aminoplast resin is a melamine formaldehyde resin.

4. An intermediate transfer member in accordance with claim 1 wherein said hydroxyl terminated poly(oxetane) based fluorinated polyether is represented by the following formula/structure

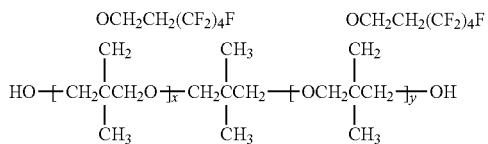

wherein the sum of x and y is from about 6 to about 20.

5. An intermediate transfer member in accordance with claim 1 where the fluoride content of said hydroxyl terminated poly(oxetane) based fluorinated polyether is from about 10 to about 70 weight percent.

6. An intermediate transfer member in accordance with claim 1 where the fluoride content of said hydroxyl terminated poly(oxetane) based fluorinated polyether is from about 20 to about 50 weight percent.

7. An intermediate transfer member in accordance with claim 1 wherein the crosslinked percentage is from about 55 to about 99 percent.

8. An intermediate transfer member in accordance with claim 1 wherein said conductive component is carbon black.

9. An intermediate transfer member in accordance with claim 1 wherein said supporting layer is present, and where the crosslinked component in the layer is deposited on said supporting substrate and said crosslinked component is represented by one of the following formulas/structures

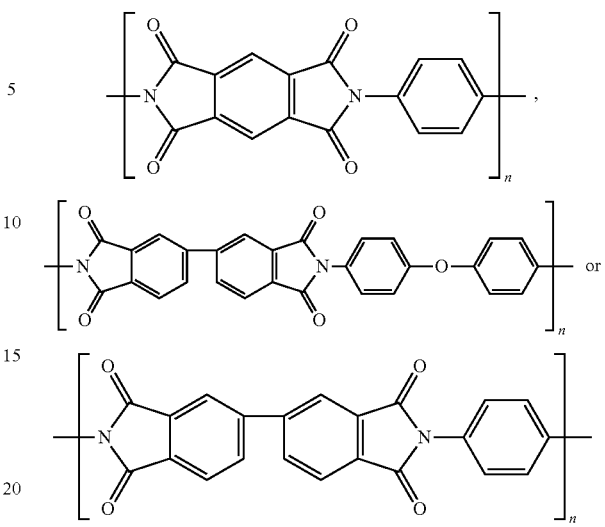

where n represents the number of repeating segments of from about 30 to about 300.

10. An intermediate transfer member in accordance with claim 9 wherein n is from about 75 to about 225.

11. An intermediate transfer member in accordance with claim 1 wherein said conductive component is selected from the group consisting of a metal oxide and a polyaniline, and wherein a supporting substrate is present.

12. An intermediate transfer member in accordance with claim 1 wherein said conductive component is selected from the group consisting of at least one of a metal oxide of tin oxide, antimony doped tin oxide, indium oxide, indium tin oxide, zinc oxide, and titanium oxide, and wherein said a supporting substrate is present.

13. An intermediate transfer member in accordance with claim 1 wherein said supporting substrate in the configuration of a layer is present and further including an elastic layer disposed between said supporting substrate layer and said crosslinked component of said hydroxyl terminated poly(oxetane) based fluorinated polyether and said aminoplast resin layer.

14. An intermediate transfer member comprising a supporting substrate layer, and a mixture layer comprising a conductive component, a melamine formaldehyde resin, an optional catalyst, and a hydroxyl-terminated poly(oxetane)-based fluorinated polyether as represented one of the following formulas/structures

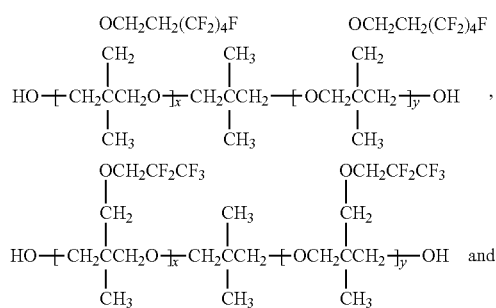

-continued
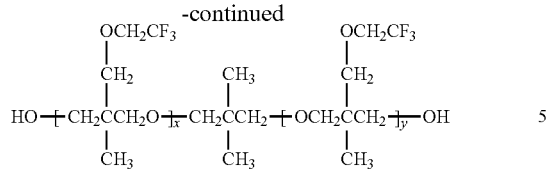
(5)
wherein x and y represent the number of segments, and wherein said hydroxyl-terminated poly(oxetane)-based fluorinated polyether is crosslinked with said melamine formaldehyde resin, and which member is substantially free of bioaccumulation characteristics.
* * * * *